United States Patent

Agarwal et al.

[11] Patent Number: 6,138,023
[45] Date of Patent: Oct. 24, 2000

[54] METHOD FOR PORTING A DIRECTORY NUMBER FROM ONE WIRELESS SERVICE PROVIDER TO ANOTHER

[75] Inventors: Anjana Agarwal, Wheaton, Ill.; Douglas Harold Rollender, Bridgewater, N.J.; Virarghavan Sudarsan, Naperville, Ill.

[73] Assignee: Lucent Technologies, Inc., Murray Hill, N.J.

[21] Appl. No.: 08/935,940

[22] Filed: Sep. 23, 1997

[51] Int. Cl.[7] ....................................... H04Q 7/24
[52] U.S. Cl. .......................... 455/445; 455/433; 379/207; 379/212; 379/220
[58] Field of Search ..................................... 455/445, 432, 455/436, 433; 379/196, 207, 212, 220

[56] References Cited

U.S. PATENT DOCUMENTS

| | | | |
|---|---|---|---|
| 5,467,381 | 11/1995 | Peltonen et al. | 455/432 |
| 5,696,816 | 12/1997 | Sonnenberg | 379/220 |
| 5,748,724 | 5/1998 | Sonnenberg | 379/212 |
| 5,839,072 | 11/1998 | Chien | 455/445 |
| 5,890,063 | 3/1999 | Mills | 455/433 |

*Primary Examiner*—Edward F. Urban
*Assistant Examiner*—Isaak R. Jama
*Attorney, Agent, or Firm*—DeMont & Breyer, LLC; Jason Paul DeMont; Wayne S. Breyer

[57] ABSTRACT

A method of porting a wireless terminal's directory number from one wireless service provider to another is disclosed. One illustrative embodiment involves creating a temporary pointer in the recipient wireless service provider's Home Location Register that, during the inchoate porting process, directs a call for the directory number to the donor wireless service provider for completion in well-known fashion. When the porting process is complete, the temporary pointer is deactivated and call processing is completed by the recipient wireless service provider in well-known fashion.

18 Claims, 2 Drawing Sheets the wireless service provider dictates the mobile directory number (i.e., the "telephone number") that the subscriber's wireless terminal can be called by. Thereafter, if the wireless subscriber desires to change his or her wireless service provider, the subscriber must surrender the mobile directory number and be issued a new mobile directory number by the new wireless service provider. As anyone who has ever had to change his or her telephone number knows, it can be extremely inconvenient, especially if the number is used for business. Therefore, it would be convenient if a wireless subscriber could take or "port" his or her mobile directory number from the original wireless service provider to another. In other words, it would be convenient if a wireless subscriber could change wireless service providers without having to change the directory number of the subscriber's wireless terminal.

METHOD FOR PORTING A DIRECTORY NUMBER FROM ONE WIRELESS SERVICE PROVIDER TO ANOTHER

FIELD OF THE INVENTION

The present invention relates to telecommunications in general, and, more particularly, to a method for porting a wireless subscriber's mobile directory number from one wireless service provider to another.

BACKGROUND OF THE INVENTION

When a wireless subscriber first obtains wireless telecommunications service from a wireless service provider the wireless service provider dictates the mobile directory number (i.e., the "telephone number") that the subscriber's wireless terminal can be called by. Thereafter, if the wireless subscriber desires to change his or her wireless service provider, the subscriber must surrender the mobile directory number and be issued a new mobile directory number by the new wireless service provider. As anyone who has ever had to change his or her telephone number knows, it can be extremely inconvenient, especially if the number is used for business. Therefore, it would be convenient if a wireless subscriber could take or "port" his or her mobile directory number from the original wireless service provider to another. In other words, it would be convenient if a wireless subscriber could change wireless service providers without having to change the directory number of the subscriber's wireless terminal.

Consistent with ANSI Standard 41, the porting of a wireless subscriber's mobile directory number from one wireless service provider to another requires at least five distinct events to occur that are not required when the wireless subscriber changes wireless service providers without porting the mobile directory number:

(1) the Recipient wireless service provider must inform the donor wireless service provider and the Number Portability Administrative Center ("NPAC") of the intent to port the subscriber's directory number;

(2) the Number Portability Database ("NPDB") must be updated with the Location Routing Number ("LRN") associated with the subscriber's directory number;

(3) a record must be created in the recipient wireless service provider's Home Location Register ("HLR") for the subscriber, which record can include, for example, the new Mobile Station Identification Number ("MSIN") and/or the Mobile Directory Number ("MDN");

(4) the subscriber's wireless terminal must be re-programmed with a new Mobile Station Identification Number ("MSIN"); and (5) the subscriber's record in the donor wireless service provider's HLR must be deleted.

If all five events do not occur simultaneously, the subscriber's service can be interrupted. For example, if the Number Portability Database is updated before the subscriber's record is created in the recipient wireless service provider's HLR, or before the subscriber's wireless terminal is re-programmed with the new MSID from the recipient wireless service provider, then a call to the subscriber's wireless terminal cannot be delivered.

In contrast, if the subscriber's record is created in the recipient wireless service provider's HLR before the Number Portability Database is updated and before the subscriber's wireless terminal is re-programmed with the new MSID, then a call originating from within the recipient system will be undeliverable because the wireless terminal will not respond to the page on the Overhead Paging Channel.

Furthermore, the coordination of these five events is complicated by the fact that the disparate elements are owned and operated by different entities. For example, the donor system owns and operates its Number Portability Database and HLR, the recipient system owns and operates its Number Portability Database and HLR, and the subscriber owns and operates its wireless terminal. Therefore, a need exists for a technique that enables a subscriber's directory number to be ported from a donor wireless service provider to a recipient wireless service provider without an interruption in the subscriber's wireless service.

SUMMARY OF THE INVENTION

Some embodiments of the present invention are capable of porting a directory number from a donor system to a recipient system without an interruption in service. In the illustrative embodiment of the present invention, this is accomplished by creating a temporary pointer in the recipient wireless service provider's Home Location Register that, during the inchoate porting process, directs a call for the directory number to the donor wireless service provider for completion in well-known fashion. When the porting process is complete, the temporary pointer is deactivated and call processing is completed by the recipient wireless service provider in well-known fashion.

DETAILED DESCRIPTION

Figure 1:
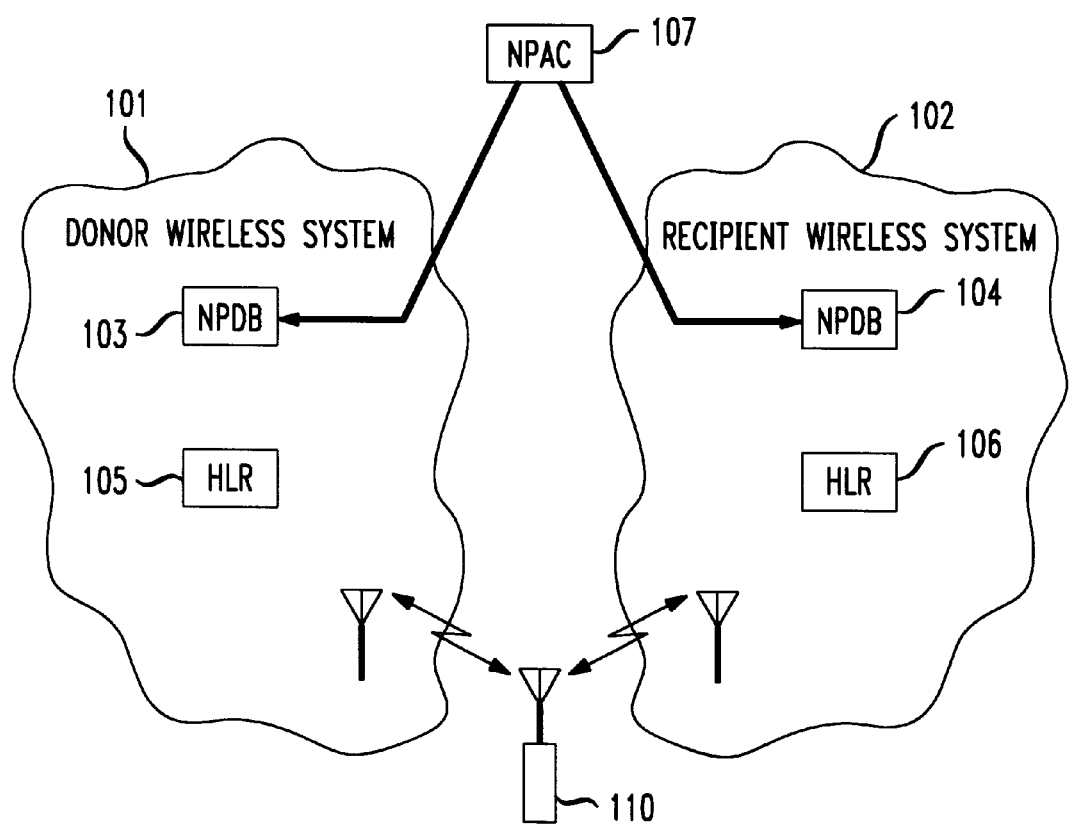
FIG. 1 depicts a schematic diagram of two wireless service provider's system.

FIG. 1 depicts a schematic diagram of a wireless telecommunications system that comprises: donor wireless service provider 101, donor Number Portability Database ("NPDB") 103, donor Home Location Register ("HLR") 105, recipient wireless service provider 102, recipient Number Portability Database ("NPDB") 104, recipient Home Location Register ("HLR") 106, and Number Portability Administrative Center ("NPAC") 107.

In accordance with the illustrative embodiment of the present invention, donor wireless service provider 101 provides wireless telecommunications service to a subscriber's wireless terminal, wireless terminal 110, before the subscriber ports his or her directory number to recipient wireless service provider 102. The geographic region serviced by donor wireless service provider 101 can be coextensive, overlapping or disjoint with the geographic region serviced by recipient wireless service provider 102. Both donor wireless service provider 101 and recipient wireless service provider 102 comprise the switches, base stations and other equipment necessary to provide wireless telecommunications service to wireless terminal 110. For pedagogical reasons, only those wireless system elements necessary to an understanding of the illustrative embodiment of the present invention are depicted in FIG. 1.

Number Portability Database 103 and 104 each enable a public network to map the 10-digit directory number of a wireless terminal to the 10-digit Location Routing Number ("LRN") of the wireless service provider that is currently the home system for that wireless terminal. Table 1 depicts a portion of a typical Number Portability Database.

TABLE 1

A Portion of a Typical Number Portability Database

| Directory Number | Location Routing Number |
|---|---|
| . . . | . . . |
| 717-234-9393 | 717-555-9393 |
| 717-234-9394 | 717-555-9393 |
| . . . | . . . |

Donor HLR 105 and recipient HLR 106 are each databases that advantageously enable a wireless system to map the 10-digit Directory Number of a wireless terminal to a record that contains information relating to that wireless terminal. For example, the record advantageously contains the Mobile Station Identification ("MSID") of the wireless terminal and information relating to the service features and billing plans for the wireless terminal. In accordance with the illustrative embodiment of the present invention, each record in HLR 105 and HLR 106 advantageously comprises two additional fields: a status field and a location routing number field.

Advantageously, the status field can be populated with one of two values: "active" or "inactive." When the status field is active it means that call-processing should proceed normally and that the value in the location routing number field is irrelevant. In contrast, when the status field is inactive it means that the wireless terminal is in the process of being ported to this wireless service provider, but that this wireless service provider is not ready to provide service to the wireless terminal and that service is still being provided by the donor wireless service provider, which is identified by the 10-digit location routing number in the location routing number field. Table 2 depicts a few of the fields in a portion of recipient HLR 106 and is also illustrative of a few of the fields in a portion of donor HLR 105.

TABLE 2

Some of the Fields in a Portion of HLR 106.

| Directory Number | Mobile Station Identification | Status | Location Routing Number |
|---|---|---|---|
| . . . | . . . | . . . | . . . |
| 324-859-9494 | 324-859-9494 | Active | X |
| 324-859-9499 | 747-321-4564 | Inactive | 293-545-8353 |
| 324-859-9502 | 324-859-9502 | Active | X |
| . . . | . . . | . . . | . . . |

NPAC 107 represents the aggregate regional Number Portability Administrative Centers. Like the Number Portability Databases, NPAC 107 is a database that contains a mapping of the 10-digit Directory Number ("DN") of a subscriber to the 10-digit Location Routing Number ("LRN") of the recipient wireless service provider. Table 3 depicts a portion of NPAC 107.

TABLE 3

A Portion of NPAC 107.

| Directory Number | Location Routing Number |
|---|---|
| . . . | . . . |
| 717-234-9393 | 717-555-9393 |
| 717-234-9394 | 717-555-9393 |
| 717-234-9395 | 201-741-5557 |
| . . . | . . . |

Periodically or sporadically, donor Number Portability Database 103 and recipient Number Portability Database 104 are updated with the contents of NPAC 107.

Figure 2:
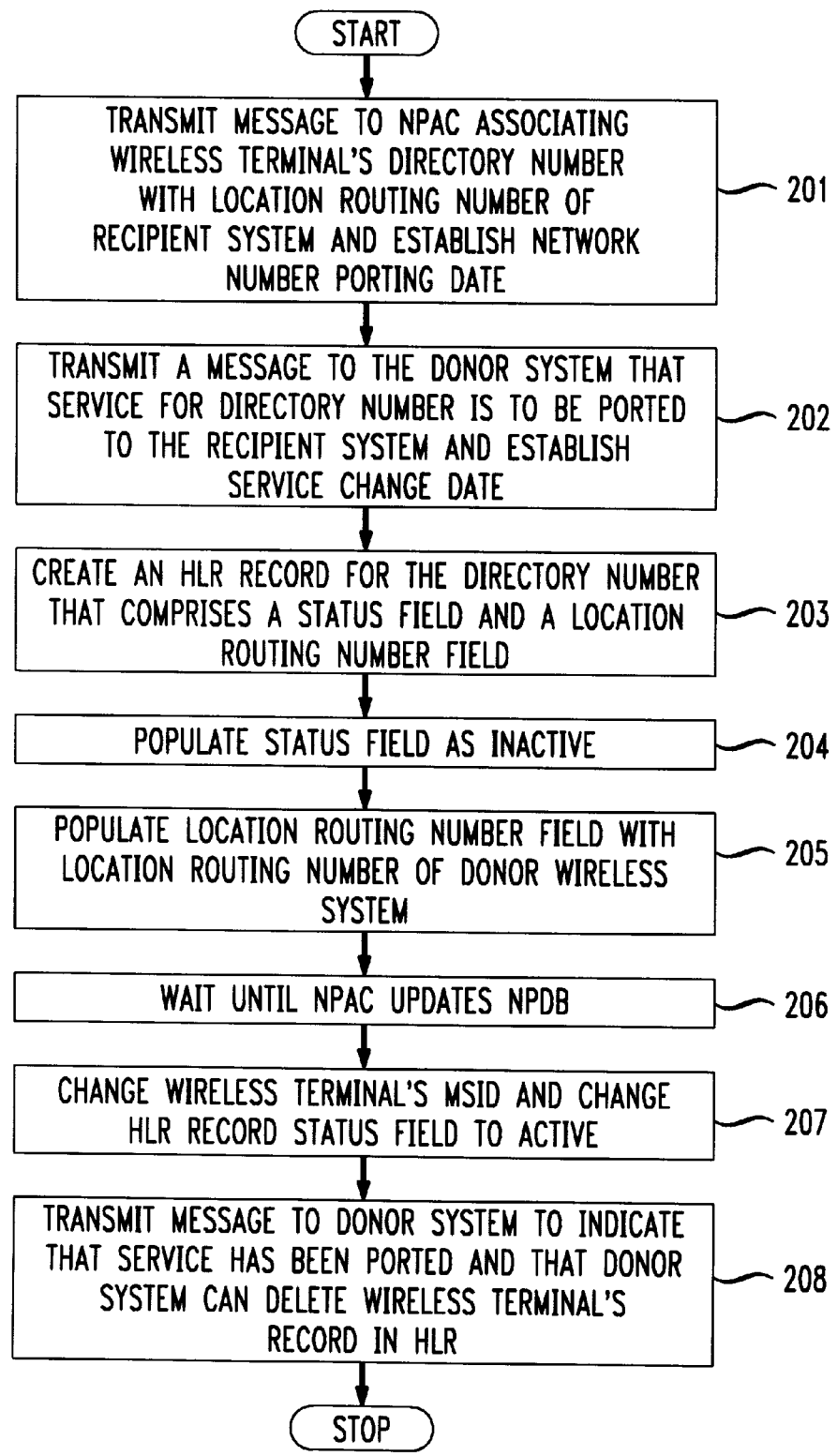
FIG. 2 depicts a flowchart of the illustrative embodiment of the present invention.

FIG. 2 depicts a flowchart of the steps performed by the recipient wireless service provider in accordance with the illustrative embodiment, which enables a directory number to be ported from donor wireless service provider 101 to recipient wireless service provider 102 without an interruption in service.

At step 201, recipient wireless service provider 102 transmits a message to NPAC 107 requesting that as of a network number porting date NPAC 107 associate the location routing number of recipient wireless service provider 102 with the directory number of wireless terminal 110.

At step 202, recipient wireless service provider 102 advantageously transmits a message to donor wireless service provider 101 indicating that the directory number for wireless terminal 110 will be ported to recipient wireless service provider 102 on the service change date. This step is intended primarily as a courtesy to donor wireless service provider 101 and enables donor wireless service provider 101 to verify that the subscriber intends to port its service to recipient wireless service provider 102.

At step 203, recipient wireless service provider 102 creates a record for the directory number in HLR 106, which record contains a status field and a location routing number field.

At step 204 recipient wireless service provider 102 populates the status field to indicate that the record is inactive, and at step 205 recipient wireless service provider 102 populates the location routing number field with the location routing number of donor wireless service provider 101. Advantageously, steps 202, 203 and 204 are performed concurrently. The purpose of the status field and location routing number field in HLR 106 is to create a temporary pointer in HLR 106 that, during the inchoate porting process, routes the call for wireless terminal 110 to donor wireless service provider 101 for completion in well-known fashion. When the porting process is complete, the temporary pointer is deactivated and call processing is completed by recipient wireless service provider 102, in well-known fashion. The temporary pointer has the added advantage that it is controlled by the same entity responsible for reprogramming the Mobile Station Identification ("MSID") in wireless terminal 110, and, therefore, the dissolution of the temporary pointer and the reprogramming of the MSID can be temporally coordinated.

After step 205 has been completed, a call originated to the ported directory number from within recipient wireless service provider 102 is routed to donor wireless service provider 101 for completion of the call by the inactive status setting in the HLR record. Similarly, a call originated to the ported number from outside recipient wireless service provider 102 is directed to donor wireless service provider 101 for completion of the call by the respective Number Portability Database, all of which still associate donor wireless service provider 101 with the directory number for wireless terminal 110. Therefore, the performance of steps 201, 202, 203 204 and 205 do not cause an interruption in service.

At step 206, recipient wireless service provider 102 waits until NPAC 107 has updated Number Portability Database 103, which occurs periodically or sporadically. Recipient wireless service provider 102 will know when Number Portability Database 103 has been updated through the NPAC administration process.

After steps 205 and 206 have been completed, a call directed to the directory number from within recipient wireless service provider 102 is still directed to donor wireless service provider 101 for completion of the call of the inactive status setting in the HLR record. And because the HLR record for the subscriber still exists in HLR 105, donor wireless service provider 101 will be capable of completing the call as before. Similarly, a call directed to wireless terminal 110 from within donor wireless service provider 101 will be completed by donor wireless service provider 101 as before because the HLR record still exists in HLR 105. And furthermore, a call originated to the ported number from outside either donor wireless service provider 101 or recipient wireless service provider 102 will be directed to recipient wireless service provider 102 by the respective Number Portability Database, which has been updated by NCAP 107. The inactive status setting in the HLR record in HLR 106 will redirect to the call to donor wireless service provider 101 for completion as before. Therefore, after both steps 205 and 206, there will be no interruption in service for wireless terminal 110.

After NPAC 107 updates the Number Portability Databases in step 206, recipient wireless service provider 102 changes the MSID in wireless terminal 110 and changes the HLR record status from inactive to active. Advantageously, both of these steps are performed concurrently. When the change in the MSID must be performed manually on wireless terminal 110 through the terminal's keypad, or the change in the MSID can be performed remotely or "over-the-air" by recipient wireless service provider 102, then the HLR record status is changed immediately after the new MSID is entered. After step 206, the porting of service to recipient wireless service provider 102 is effectively accomplished.

At step 208, recipient wireless service provider 102 advantageously transmits a message to donor wireless service provider 101 indicating that service for wireless terminal 110 has been successfully ported and notifying donor wireless service provider 101 that the subscriber's record in HLR 105 can be deleted at donor wireless service provider 101's convenience.

It is to be understood that the above-described embodiments are merely illustrative of the invention and that many variations may be devised by those skilled in the art without departing from the scope of the invention. It is therefore intended that such variations be included within the scope of the following claims.

What is claimed is:

1. A method of porting a directory number from a donor system to a recipient system, said method comprising:

creating a home location register record in a home location register associated with said recipient system for said directory number, which home location register record comprises a status field and a location routing number field;

populating said status field as inactive and said location routing number field with a first location routing number that is associated with said donor system; and routine an incoming call that is associated with said directory number based on said first location routing number when said status field is populated as inactive.

2. The method of claim 1 further comprising the step of changing a mobile station identification of a wireless terminal associated with said directory number.

3. The method of claim 1 further comprising the step of transmitting an update request to a number portability administrative center, which update associates a directory number with a second location routing number that is associated with said recipient system.

4. The method of claim 3 further comprising the step of receiving from said number portability administrative center an update that associates said directory number with said second location routing number.

5. The method of claim 1 further comprising the step of transmitting a message to said donor system that indicates that said directory number is being ported to said recipient system.

6. The method of claim 1 further comprising the step of transmitting a message to said donor system that requests that said donor system delete a record in a second home location register associated with said directory number.

7. The method of claim 1 further comprising the step of populating said status field to indicate that said first home location register record is active.

8. A method of porting a directory number from a donor system to a recipient system, said method comprising:

transmitting an update request to a number portability administrative center, which update associates a directory number with a location routing number that is associated with said recipient system;

creating a home location register record in a home location register associated with said recipient system for said directory number, which home location register record comprises a status field and a location routing number field; and routing an incoming call that is associated with said directory number based on a datum in said location routing number field when said status field is populated as inactive.

9. The method of claim 8 further comprising the step of populating said status field to indicate that said first home location register record is active.

10. The method of claim 8 further comprising the step of changing a mobile station identification of a wireless terminal associated with said directory number.

11. The method of claim 8 further comprising the step of receiving from said number portability administrative center an update that associates said directory number with said second location routing number.

12. The method of claim 8 further comprising the step of transmitting a message to said donor system that indicates that said directory number is being ported to said recipient system.

13. The method of claim 8 further comprising the step of transmitting a message to said donor system that requests that said donor system delete a record in a second home location register associated with said directory number.

14. A method of porting a directory number from a donor system to a recipient system, said method comprising:

creating a home location register record in a home location register associated with said recipient system for said directory number, which home location register record comprises a status field and a location routing number field;

routine an incoming call that is associated with said directory number based on a datum in said location routing number field when said status field is populated as inactive; and transmitting a message to said donor system that requests that said donor system delete a record in a second home location register associated with said directory number.

15. The method of claim 14 further comprising the step of populating said status field to indicate that said first home location register record is active.

16. The method of claim 14 further comprising the step of changing a mobile station identification of a wireless terminal associated with said directory number.

17. The method of claim 14 further comprising the step of receiving from said number portability administrative center an update that associates said directory number with said second location routing number.

18. The method of claim 14 further comprising the step of transmitting a message to said donor system that indicates that said directory number is being ported to said recipient system.

* * * * *